Oct. 3, 1961 L. M. PIECHA 3,003,138

MAGNETIC CORE MEMORY ELEMENT

Filed Jan. 4, 1960

LEO M. PIECHA,
INVENTOR

BY Ernest F. Oberheim
AGENT

United States Patent Office 3,003,138
Patented Oct. 3, 1961

3,003,138

MAGNETIC CORE MEMORY ELEMENT

Leo M. Piecha, Los Angeles, Calif., assignor to Hughes Aircraft Company, Culver City, Calif., a corporation of Delaware Filed Jan. 4, 1960, Ser. No. 176
1 Claim. (Cl. 340—174)

This invention relates to magnetic core memory elements and more particularly to an element utilizing the magneto-resistive effect to achieve changes in the magnetic state of the element.

Magnetic core memory elements are fundamental components in the electronic digital computing art and have been used to provide storage of binary information which is relatively fast and which provides instantaneous access to information stored therein. In such elements, a binary "1" is represented by a magnetization of the magnetic core in a first sense, and a binary "0" is represented by a magnetization of the core in the opposite sense. If electric current is passed in a first direction through an input winding magnetically coupled to the core, magnetization of the core in a first sense representing a binary "1" will be produced. Conversely, if current is applied through the input winding in the opposite direction, magnetization in the opposite sense repreesnting a binary "0" will be produced.

Such devices, which are well known in the art, require the control of the direction of current applied to the input winding. Since this control may be relatively difficult to achieve, a unidirectional current pulse may be used to provide both states of magnetization.

If two input windings wound or energized in opposite senses are used, then magnetization of the core in either sense may be produced if a unidirectional current pulse is applied to a chosen input winding.

While the use of oppositely sensed input windings permits the use of unidirectional current pulses, the appropriate input winding must be selected to record a binary "1" or "0," as may be desired.

This invention provides selection of input windings on a magnetic core by the use of a phenomenon called the "magneto-resistive" effect, a corollary to the well-known Hall effect. It has been observed that if a crystal of a suitable material is subjected to a magnetic field transverse to the direction of current applied to the crystal, the electrical resistance of the crystal with respect to the applied current will be increased. This phenomenon has been called the "magneto-resistive" effect and will be found described at page 313 of "The Theory of Metals" by A. H. Wilson, second ed. (1953), reprinted, published by Cambridge University Press. As is described in the above-mentioned article, the magneto-resistive effect is concomitant to the Hall effect and arises because of the electron movement within the crystal produced by the applied magnetic field. It has been found that the change in resistivity of the crystal is proportional to the square of the electron mobility in the material. Since the intermetallic semiconductors such as indium antimonide and indium arsenide have very high electron mobilities, these materials can be used to provide changes in resistivity of an order high enough to make practical the device which will be described. As an example, if a magnetic field strength of 10,000 gausses is applied to a suitable crystal, the resistance of the crystal may change by as much as a factor of 25–50.

Accordingly, it is an object of the present invention to provide a magnetic core memory element in which a pair of input windings are selectively energized in opposite senses in accordance with binary information signals.

Another object of this invention is to provide a magnetic memory element in which the direction of magnetization of the magnetic core forming a part of the element is controlled by changing the electrical resistance of one of a pair of input circuits.

More particularly, it is an object of this invention to provide an arrangement for selectively magnetizing a magnetic core in either of two opposed senses wherein magneto-resistive switching is employed to control excitation of the core windings.

A further and specific object of this invention is to provide a magnetic memory element in which one of a pair of input windings is selected by means of the magneto-resistive effect.

Further objects and advantages of this invention will become apparent by reference to the following description considered in connection with the accompanying drawing illustrating an embodiment of the invention.

Figure 1:
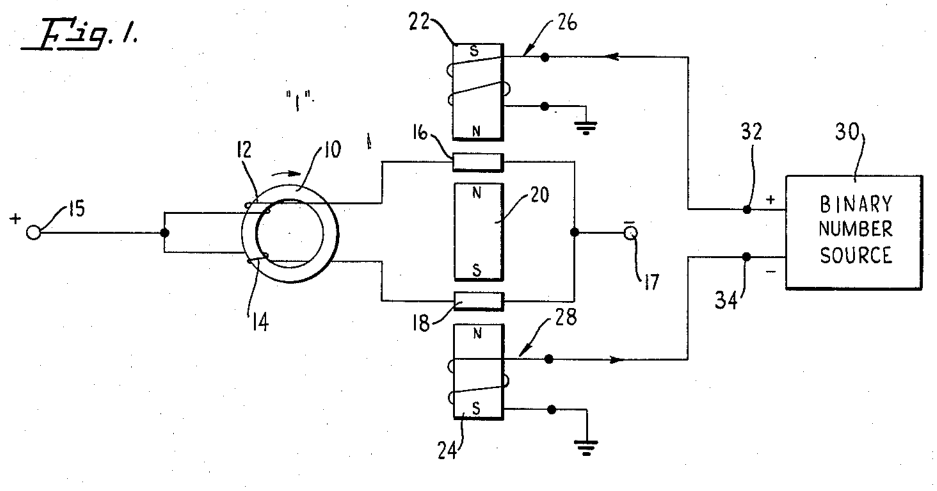
FIG. 1 is a circuit diagram illustrating an embodiment of the present invention and showing the recording of a binary "1"
Figure 2:
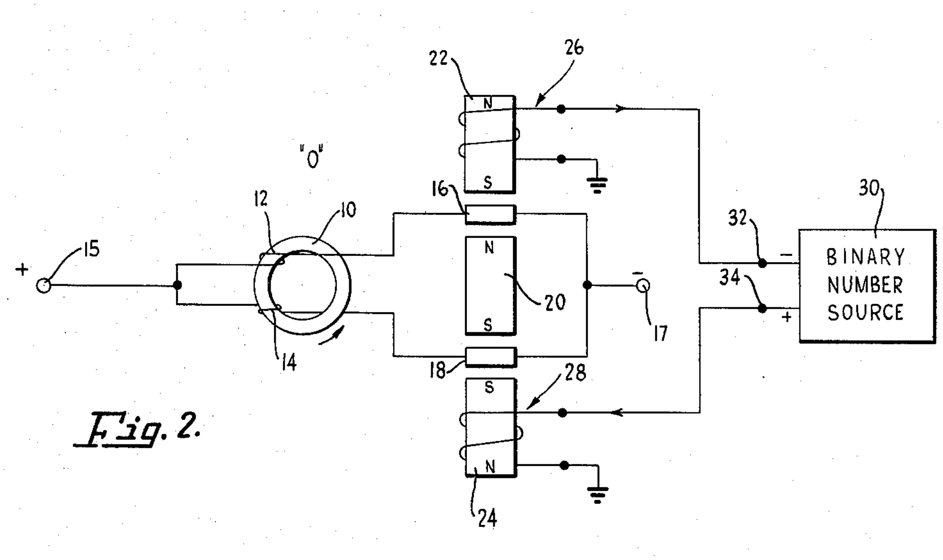
FIG. 2 is a circuit diagram illustrating an embodiment of the present invention and showing the recording of a binary "0."

Turning now to FIG. 1, there is shown a circuit diagram revealing the details of an embodiment of the present invention. A core 10 of magnetizable material is provided with a pair of windings 12 and 14 which are energized to produce opposed magnetic fields. While magnetic materials exhibiting a "square" hysteresis characteristic are desirable, such materials are not necessary for the operation of this device since all that is required is a core material which will retain a given direction of magnetization. One of the ends of each of the windings 12 and 14 are connected together. The opposite ends of the windings 12 and 14 are connected to crystals 16 and 18 respectively. These connections are made to one end face of each of the crystals, as shown in FIG. 1. The opposite end faces of each of the crystals are electrically connected to a terminal 17. A direct current source is connected between a terminal 15 which is in turn connected to the junction of the windings 12 and 14 and the terminal 17. Between the crystals 16 and 18 is placed a permanent magnet 20 having a north pole at its upper end and a south pole at its lower end. The magnet 20 is adjacent crystal side faces perpendicular to those crystal end faces to which electrical connection has been made. Soft iron cores 22 and 24 are placed adjacent the remaining opposite side faces of each of the crystals. The iron cores 20 and 24 are provided with solenoid windings 26 and 28, respectively, the windings being wound in the same sense. One end of the winding 26 is connected to ground and the other end of the winding 26 is connected to a first terminal 32 of a binary number source 30, such as a flip flop. One end of the winding 28 is connected to ground, and the other end of the winding 28 is connected to a second terminal 34 of the binary number source 30. In the embodiment shown, a binary "1" will be represented by a positive voltage at the terminal 32 and a negative voltage at the terminal 34. A binary "0" is represented by a positive voltage at the terminal 34 and a negative voltage at the terminal 32. The operation of the device shown in FIGS. 1 and 2 is described below.

FIG. 1 shows the electrical signal and magnetic field produced during the recording of a binary "1." Assuming that magnetization of the core 10 in a clockwise direction represents a binary "1," FIG. 1 shows how such a magnetization is produced. A direct current source is connected across the terminals 15 and 17 such that the terminal 15 is positive and terminal 17 is negative. Thus, an electric current will flow through the windings 12 and 14. In the absence of magnetic fields or in the presence of equal magnetic fields, through the crystals 16 and 18, the resistance of these crystals remains equal and equal currents flow through the windings 12 and 14. With equal current flowing through both windings, no resultant magnetization of the core 10 is obtained. However, if the resistance of one of the crystals 16 or 18 is increased, the current through the associated winding will be decreased and a correspondingly greater current exists in the other winding. This greater current will tend to magnetize the core 10. If the resistance of the crystal 18 is increased, more current will flow through the winding 12 than through the winding 14, and a clockwise direction of magnetization of the core 10 results. Since a clockwise magnetization of the core 10 has been designated to represent a binary "1," a binary "1" has been recorded. It is thus evident that in order to record a binary "1," a magnetic field through the crystal 18 must be provided.

As stated above, it is desired to record a binary "1" when a positive voltage exists at the terminal 32 and a negative voltage exists at the terminal 34 of the binary number source 30. If the terminal 34 has a negative voltage, current will flow from ground to the terminal 34. This direction of current produces a north pole at the upper end of the iron core 24 and a south pole at the lower end of the iron core 24. Thus, we have a north pole adjacent one face of the crystal 18 and a south pole adjacent the opposite face of the crystal 18. These poles produce a resultant magnetic field through the crystal 18. As has already been discussed, the passage of a magnetic field through the crystal 18, which can conveniently be made of indium antimonide or indium arsenide, in coincidence with the existence of an electric field across the end faces of the crystal 18, produces an increase in resistance to the flow of electric current in the direction of the applied electric field.

Simultaneously, the existence of a positive voltage at the terminal 32 produces a current flow in the winding 26 in such a direction as to produce a south pole at the upper end of the iron core 22 and a north pole at the lower end of the iron core 22. Thus, the opposite side faces of the crystal 16 are each adjacent the north poles and, ideally, no resultant magnetic field passes through the crystal 16. The resistance of the crystal 16 will then be lower than the resistance of crystal 18 and the desired resistance change for recording a binary "1" has been produced.

FIG. 2 shows the recording of a binary "0." In this case, the voltage at the terminals 32 and 34 is reversed, with the terminal 34 having a positive voltage and terminal 32 having a negative voltage. Thus, the directions of current through the windings 26 and 28 are reversed, in turn reversing the polarities of the iron cores 22 and 24 and producing a magnetic field through the crystal 16 which is greater than the magnetic field through the crystal 18. Current flow through the crystal 18 will be greater than through the crystal 16 and this unbalanced current will produce a counterclockwise magnetization of the core 10.

It has been shown that a binary "1" condition of binary number source 30 that is a positive voltage at terminal 32 and a negative voltage at terminal 34, will produce a clockwise direction of magnetization of the core 10 which has been designated to represent a binary "1." It has also been shown that a binary "0" condition of the binary number source 30, that is a negative voltage at terminal 32 and a positive voltage at terminal 34, results in a counterclockwise direction of magnetization of the core 10 which has been designated as representing a binary "0." Thus, the embodiment of the invention shown in FIGS. 1 and 2 has been shown to magnetize the core 10 in accordance with the electrical state of the binary number source 30.

Other embodiments of the principles of this invention are possible. For example, the permanent and electromagnets shown in FIGS. 1 and 2 could be replaced with conventional magnetic yokes, with the crystals 16 and 18 each being placed between the poles of such a yoke. In this case, selective energization of the yokes would record either a binary "1" or a binary "0" by producing the required magnetization of the core 10.

What is claimed is:

A magnetic element comprising a magnetic core adapted to be magnetized in either of two senses; a pair of input windings magnetically coupled to said core and adapted to receive electric current, each winding for magnetizing said core in an opposite sense in response to said current; a pair of crystals each connected in series with one of said windings and each responsive to a magnetic field applied therethrough for controlling the amount of current passing through said windings; magnetic field generating means responsive to control signals for providing a magnetic field in accordance therewith, said magnetic field generating means comprising a permanent magnet having each of its poles adjacent one face of each of said crystals and a pair of electro-magnets each having one pole adjacent the opposite face of said crystal; and control signal providing means for supplying said control signals to said magnetic field generating means.

References Cited in the file of this patent

UNITED STATES PATENTS

| | | |
|---|---|---|
| 2,811,710 | Demer | Oct. 29, 1957 |
| 2,913,708 | Paull | Nov. 17, 1959 |

OTHER REFERENCES

"The Hall Effect," T. R. Lawson, Westinghouse Engineer, May 1957, vol. 17, No. 3, pp. 71–73.